(12) United States Patent
Kern et al.

(10) Patent No.: US 8,910,663 B2
(45) Date of Patent: Dec. 16, 2014

(54) UNI-DIRECTIONAL VALVE, FILTERING FACE MASK

(75) Inventors: Frank Kern, Pliezhausen (DE); Torben Skov, Plitzhausen (DE)

(73) Assignee: Moldex-Metric, Inc., Culver City, CA (US)

(*) Notice: Subject to any disclaimer, the term of this patent is extended or adjusted under 35 U.S.C. 154(b) by 458 days.

(21) Appl. No.: 13/200,254

(22) Filed: Sep. 22, 2011

(65) Prior Publication Data

US 2012/0091381 A1    Apr. 19, 2012

(51) Int. Cl.
*F16K 15/14*    (2006.01)
*A62B 18/10*    (2006.01)

(52) U.S. Cl.
CPC ............... *A62B 18/10* (2013.01); *F16K 15/145* (2013.01)
USPC ...................................... 137/843; 128/207.12

(58) Field of Classification Search
USPC .................. 137/843, 860, 512.15; 128/207.12
See application file for complete search history.

(56) References Cited

U.S. PATENT DOCUMENTS

| 3,498,321 | A | * | 3/1970 | Barrett et al. | ............... 137/843 |
| 4,381,019 | A | * | 4/1983 | Lindtveit | ................... 137/843 |
| 4,934,362 | A | * | 6/1990 | Braun | .................. 128/207.12 |

* cited by examiner

*Primary Examiner* — Kevin Lee
*Assistant Examiner* — P. Macade Nichols
(74) *Attorney, Agent, or Firm* — Charles H. Schwartz

(57) ABSTRACT

A uni-directional valve for an air path of a ventilation device. A flexible valve element is held biased in a housing of the uni-directional valve to close at least one air passage located in a sealing section and with a sealing portion to at least partially open the air passage if the valve element is impinged by a sufficient air pressure against the bias. The valve element is designed as cylinder and the sealing portion is located on the lateral surface of the cylinder. The sealing portion is located opposite to a support portion located on the lateral surface of the cylinder. The support portion interacts with a support section of the housing. The distance between the support section and the sealing section of the housing is smaller than the distance between the support portion and the sealing portion in the unbiased state of the valve element.

9 Claims, 6 Drawing Sheets

UNI-DIRECTIONAL VALVE, FILTERING FACE MASK

CROSS-REFERENCE TO RELATED APPLICATIONS

This Application is based on European Patent Application #10013194.5 filed on Oct. 1, 2010 by Frank Kern and Torben Skov.

TECHNICAL FIELD

The present invention relates to a uni-directional valve for an air path of a ventilation device, comprising a flexible valve element, which is held biased in a housing of the uni-directional valve to close at least one air passage located in a sealing section of the housing with a sealing portion in a sealing manner and to at least partially open the air passage if the valve element is impinged by a sufficient air pressure against the bias. The present invention further pertains to a filtering mask, comprising a mask body adapted to fit over the nose and the mouth of a person and an exhalation valve attached to the mask body in a penetrating manner.

BACKGROUND OF THE INVENTION

Uni-directional valves, also called non-return valves, are used for controlling the airflow in an air path of a ventilation device such as a filtering facemask, protective clothing or air conditioning devices. Unidirectional valves allow the air to flow through the valve in one direction, but prevent the air from flowing through the valve in the opposite direction. Uni-directional valves are used to improve the comfort and efficiency in particular of filtering face masks by allowing the exhaled air of the user to escape easily and by closing when the user inhales, so that the inhaled air can only flow through the filtering part of the filtering mask. Such uni-directional valves have been disclosed in, for example, the European patent application EP 0756881 A2 or European patent EP 0267428 B1. Furthermore, European patent application EP 0737489 A2 discloses a unidirectional valve which comprises a flexible valve element designed as a flap, the flap being secured to a housing of the uni-directional valve at one end and resting upon a seal ridge of the housing to close an air passage in a sealing manner. The flap comprises a free end that is lifted from the sealing ridge when a fluid is passing through the valve with a sufficient pressure. The valve element is held biased in the housing to close the air passage by being secured to the housing at the one end and by providing the sealing ridge with a concave curvature. The part of the flap contacting the concave curvature forms a sealing portion of the valve element and is lifted from the curvature if the valve element or flap is impinged by a sufficient air pressure.

European patent application EP 1 647 310 A1 relates to a filtering face mask comprising an exhalation valve. The exhalation valve includes a cup-shaped flexible valve element, the bottom of which forms a sealing portion interacting with the sealing section of the housing. The circumferential sidewall of the valve element extends essentially perpendicular to the bottom and is designed as an axial flexible bellow that is interacting with the housing. In order to open the exhalation valve the bottom of the flexible valve element has to be lifted from the sealing section of the housing counter to the inherent elasticity of the bellow. However, in particular the manufacturing of such a valve element is complex and cost intensive.

Ventilation devices as described above and in particular filtering face masks should be safe by not allowing contaminants to enter the interior of the face mask through the uni-directional valve. To be comfortable, the filtering face mask should displace as large a percentage of exhaled air as possible through the uni-directional valve with minimal effort.

OBJECT OF THE INVENTION

It is an object of the present invention to design a uni-directional valve, in particular for a filtering face mask, which is easy and cost effective in construction, which can be mounted easily and which allows air to pass in one direction with a low pressure and which ensures a safe closing of the air passage when air flows into the opposite direction.

BRIEF SUMMARY OF THE INVENTION

The inventive uni-directional valve is characterized in that the valve element is designed as cylinder and that the sealing portion is located on the lateral surface of the valve element. The sealing portion is located opposite to a support portion also located on the lateral surface of the valve element. The support portion interacts with a support section of the housing, and whereby for causing the bias the distance between the support section and the sealing section of the housing is smaller than the distance between the support portion and the sealing portion of the valve element in its unbiased state.

The valve element of the inventive uni-directional valve is designed as cylinder providing a lateral surface on which the sealing portion for closing the at least one air passage is located. The flexible valve element can be designed as a cylinder with different cross-sections. On the lateral surface of the cylinder or of the valve element the sealing portion and the support portion are located on opposite sides.

Therefore, the cylinder is designed at least such that it comprises two portions arranged opposite to one another. For securing and biasing the valve element in the housing the housing comprises a support section that interacts with the support portion of the valve element. Thus, also the support section and the sealing section of the housing are arranged opposite to one another. By forming the distance between the support section and the sealing section of the housing smaller than the distance between the support portion and the sealing portion of the valve element in its unbiased state the valve element is held biased in the housing due to its inherent elasticity. The inherent elasticity forces the sealing portion of the valve element against the sealing section of the housing, thereby closing the air passage in a sealing manner. The inventive uni-directional valve has the advantage that the valve element does not have to be secured in the housing on one end, for example by fixing one end of the valve element to the housing in a form- and/or force-fitting manner. Instead, the valve element of the inventive uni-directional valve is held in the housing due to its biased state between the support section and the sealing section of the housing. Therefore, no extra elements or means are necessary for holding the valve element in place and for guaranteeing a safe sealing of the at least one air passage. Furthermore, the uni-directional valve can be mounted fast and easily, since the valve element has only to be arranged in or inserted into the housing in the biased manner as described above.

Preferably, the support section of the housing includes at least one support element against which the valve element abuts with its lateral surface forming the support portion. The at least one support element can be arranged directly opposite to the air passage or the sealing section. According to an alternative embodiment, the at least one support element can be arranged on the opposite side of the housing at least partially offset to the air passage or the sealing section. Preferably, at least two support elements are provided by the support section, in particular at least partially offset to the air passage or the sealing section on opposite sides of the air passage or the sealing section.

The lateral surface of the valve element is preferably aligned parallel to the axis of the cylinder. According to an alternative embodiment the lateral surface is provided with a curvature in the axial direction. The curvature can be designed such that the lateral surface is provided with a concave or convex surface. According to a further alternative of the embodiment the lateral surface of the valve element or the cylinder is designed conical if seen in the longitudinal cross-section of the cylinder.

According to a preferred embodiment of the invention at least one opening through which air passing through the air passage can escape is formed in the housing at least essentially perpendicular to the air passage. When the lateral surface of the valve element or the cylinder is impinged by a sufficient air pressure against the bias, it opens the air passage so that air can pass through. Usually according to the prior art—the air escapes the uni-directional valve in a direction essentially parallel or aligned with the air passage. Due to the particular arrangement of the opening at least essentially perpendicular to the air passage the air enters the uni-directional valve for example from the side and escapes through the top or the bottom. This leads to the advantage that the air escapes from the uni-directional valve using a short path. Possible flow-resistors in the air path from the air passage to the at least one opening are minimized, thereby the counter-pressure acting on the valve element or against an exhaling user of a filtering face mask comprising the uni-directional valve is lowered. According to a preferred embodiment of the uni-directional valve the at least one opening is assigned to the axial front or back side of the cylinder or the valve element. The opening is particularly arranged in an area of the housing between the sealing portion and the support portion in the neutral state of the valve element, e.g. when the uni-directional valve is closed, preferably close to the sealing portion. Due to this arrangement, air can escape from the uni-directional valve as soon as the sealing portion of the valve element is moved just a little bit from its sealing position.

According to a particular embodiment of the invention the cross-section of the cylinder or the valve element is oval, whereby the sealing portion and the support portion are formed by the longer sides of said oval cross-section, respectively. Whereas the cross-section of the valve element can be shaped in many different ways, for example polygonal or circular, the oval design allows for a large sealing portion interacting with the sealing section of the housing, the sealing portion can easily be moved or dislocated by a low pressure acting against the bias.

According to a further embodiment of the invention the cross-section of the cylinder is ring-shaped. In this case the cross-section of the valve element comprises preferably a small wall thickness that allows the moving at least of a part of the sealing portion of the valve element if the sufficient air pressure acts against the bias. Preferably, a wall thickness of the valve element between 0.3 and 0.8 mm, in particular between 0.35 and 0.55 mm is provided. The ring-shaped design of the valve element leaves the valve element or the cylinder hollow, which lowers the necessary air pressure for opening the air passage.

According to an alternative embodiment of the inventive unidirectional valve the cross-section of the cylinder or the valve element is shaped like a cylindrical ring-segment. The cylindrical ring-segment differs from the above-described ring-shaped cross-section in that the ring-segment does not form a closed loop, but is disconnected in at least one area forming two preferably opposite free ends. In the unbiased state of that valve element, the valve element can be formed by a flat basic element which is bent into the circular shape. If inserted into the housing of the uni-directional valve, the ring-segment-shaped valve element or cylinder is preferably bent such that the two free ends are arranged opposite to one another. The free ends can either be in touch contact with each other or arranged apart from each other in particular by at least one projection of the housing arranged between the two ends. In contrast to the earlier described design of the cylindrical section as a closed ring, the latter design allows for a less cost-intensive manufacturing of the valve element.

According to a further embodiment of the invention the housing comprises a pot-like receptacle with a cylindrical cross-section in which the valve element is coaxially held, the cylindrical cross-section substantially corresponding to the cross-section of the valve element. According to this embodiment, the shape of the valve element and the pot-like receptacle is preferably almost identical, apart from that the distance between the support section and the sealing section is smaller than the distance between the support portion and the sealing portion as described above. Particularly, the cross-section of the receptacle is shaped oval. Due to the similar shapes the valve element is held in a safe and easy manner by the housing. The support section and the sealing section of the housing are formed by the preferably circumferential side-wall of the pot-like receptacle.

According to another embodiment of the invention the opposite shorter sides of the oval valve element or cylinder are arranged spaced apart to the housing. This leaves only the longer sides of the oval cross-section in contact with the housing if no air pressure is applied against the bias. Once air pressure is applied, the longer sides, in particular the longer side providing the sealing portion can be moved or dislocated from its sealing position, while the spaced apart arrangement of the shorter sides leaves room for a compensating movement of the valve element.

According to a preferred embodiment the valve element of the unidirectional valve is designed tubular. In this case, the whole valve element is ring-shaped preferably with a small wall thickness as described above. Particularly in mass production the tubular design of the valve element leads to many advantages, since, for example, the valve element can be cut from a manufactured tube in different sizes—as seen in the longitudinal direction. Therefore, the valve element can easily be configured to fit different uni-directional valves for different requirements.

Preferably, the housing comprises a further sealing section with a further air passage formed in the support section of the housing and the sealing section with the air passage is formed in a further support section of the housing. The sealing portion of the valve element preferably forms a further support portion interacting with the further support section of the housing and the support portion of the valve element preferably forms a further sealing portion interacting with the further sealing section of the housing.

Herewith, a uni-directional valve is provided which comprises two air passages, each air passage being formed in a sealing section. The air passages are therefore arranged opposite to one another in the housing of the uni-directional valve. In particular in combination with the opening arranged essentially perpendicular to the air passage, this embodiment allows for a high volume of air passing through the uni-directional valve once the necessary pressure for moving the sealing portion is reached. It is understood that more air passages and/or sealing regions as well as supporting regions can be provided.

Preferably, the support section and/or the further support section comprise a support structure extending at least partially across the respective air passage. The support structure supports the support portion of the valve element such that the pretension acting on the sealing portion guarantees a safe closure of the air passages. The support structure can be designed as a single bar extending across the sealing section or at least across the opening of the air passage. The support structure can also be designed as a grid of bars arranged across the air passage or the sealing section. The support structure preferably forms a support element of the support section as described above.

The housing comprises preferably a cover arranged on the receptacle. The valve element, in particular the tubular or cylindrical valve element, can be inserted into the pot-like receptacle of the housing and be held axially in that position by closing the receptacle with the cover arranged on the receptacle. The cover can be fastened on the receptacle in a force and/or form fitting manner. Of course it is also possible to provide an integrally joined cover by material engagement. According to an alternative embodiment the housing can be designed as two halves which can be joined in a plane extending along the longer axis of the oval shape. In this case the cover is preferably also divided in two halves whereas each half is designed in one piece with one half of the receptacle, respectively.

According to another embodiment of the invention the cover or the bottom of the pot-like-shaped receptacle form one or more of the openings through which air passing through the air passage or the further air passage can escape. By providing the one or more openings in the bottom or in the cover, the openings are arranged essentially perpendicular to the respective air passage formed in the sidewall.

Preferably, the bottom and/or the cover of the receptacle comprise a recess which is located in the area of the sealing portions of the valve element or the cylinder. The axial recess allows the sealing portion of the valve element to be moved from the sealing position into an open position without friction, thereby lowering the necessary air pressure for opening the valve element even more, so that the valve can be opened with minimum force.

The inventive filtering mask is characterized in that the exhalation valve is designed as uni-directional valve as described above. In a preferred embodiment the uni-directional valve is located on the mask such that the at least one air passage is arranged on the side of the mask body facing the person and that the cover with the at least one opening therein is arranged on the side of the mask body facing away from the person. In order to lower the pressure drop across the face mask the uni-directional valve is located preferably on the filtering face mask essentially directly in front of the wearer's mouth. The uni-directional valve can be held on the mask body in a form- or force-fitting manner. In this regard, the uni-directional valve can be attached to the mask by pressing the uni-directional valve into a respective opening in the mask body such that the uni-directional valve is preferably friction-locked in the opening of the mask body. In another exemplary embodiment, where the uni-directional valve is attached to the mask body by material engagement, the uni-directional valve is preferably attached to the mask by ultrasonic welding or adhesive attachment. Due to the preferred arrangement of the uni-directional valve on the mask body a user of the face mask can exhale very comfortably and be sure that while inhaling no contaminants can pass through the uni-directional valve.

BRIEF DESCRIPTION OF THE SEVERAL VIEWS OF THE DRAWINGS

The invention will now be more particularly described, by way of example, with reference to the accompanying schematic drawings, in which.

DETAILED DESCRIPTION OF THE INVENTION

Figure 1A:
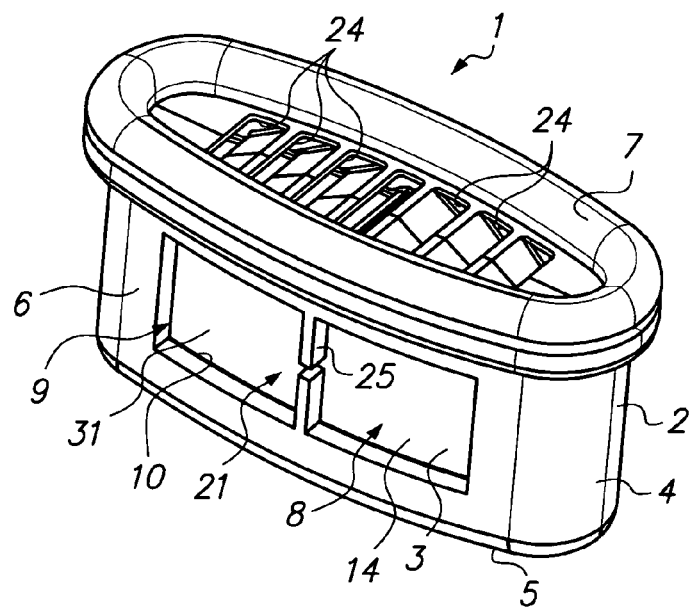
FIGS. 1A and 1B are perspective views of a uni-directional valve in two different states of use.

FIGS. 1 to 4 illustrate a uni-directional valve 1 configured for an air path of a ventilation device, in particular for a ventilation device designed as a filtering face mask. FIGS. 1A and 1B show the unidirectional valve 1 in a perspective view, respectively. The unidirectional valve 1 comprises a housing 2 in which a flexible valve element 3 is arranged. The housing 2 comprises a pot-like receptacle 4, the pot-like receptacle 4 having a bottom 5 and a sidewall 6 that extends across the circumference of the bottom 5. The housing 2 further comprises a cover 7 which is arranged on the open top of the pot-like receptacle 4. The cover 7 is held on the receptacle 4 preferably in a form- and/or force-fitting manner.

Figure 4:
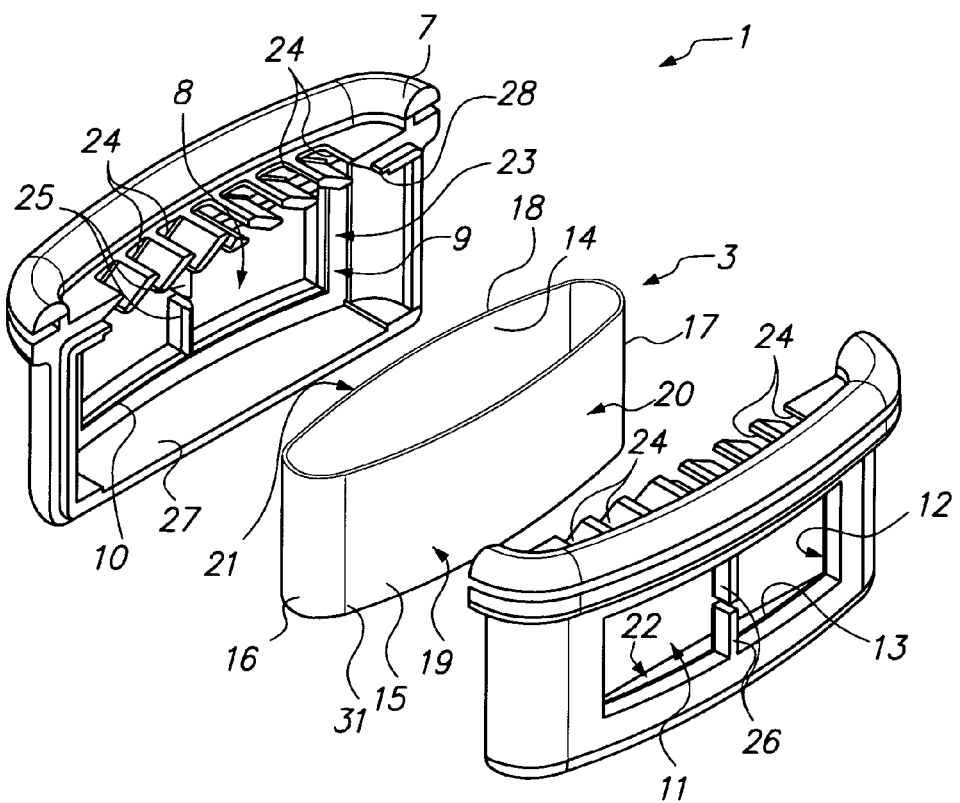
FIG. 4 is an exploded view of the uni-directional valve.

In the sidewall 6 of the pot-like receptacle 4 an air passage 8 is provided by an orifice in the sidewall 6. The pot-like receptacle 4 has a cylindrical cross-section that is shaped oval. The air passage 8 is arranged on a longer segment of the sidewall 6 of the oval shaped receptacle 4. Furthermore, the air passage 8 is arranged in a sealing section 9 of the housing 2. The sealing section 9 comprises a sealing ridge 10 arranged on the inside of the housing 2, surrounding the air passage 8. The sealing ridge 10 can be best seen in FIG. 4, which shows an exploded view of the uni-directional valve 1. FIG. 4 also illustrates that on the other longer segment of the sidewall 6 opposite to the air passage 8 a further air passage 11 is provided in a further sealing section 12. The further air passage is correspondingly surrounded by a sealing ridge 13 provided on the inside of the sidewall 6.

FIG. 4 also shows the flexible valve element 3 designed as cylinder 31, the cylinder being designed tubular with an oval ring-shaped cross-section. The valve element 3 or cylinder 31 comprises two longer sides 14, 15 and two shorter sides 16, 17. On the lateral surface of the longer side 14 of the cylinder 31 a sealing portion 18 is located. The sealing portion 18 interacts with the sealing section 9 of the housing 2 in a sealing manner. On the lateral surface of the longer side 15 a further sealing portion 19 is located, which interacts with the further sealing section 12. The interaction between the sealing portions 18, 19 and sealing sections 9, 12 will be described in more detail further below.

Figure 2A:
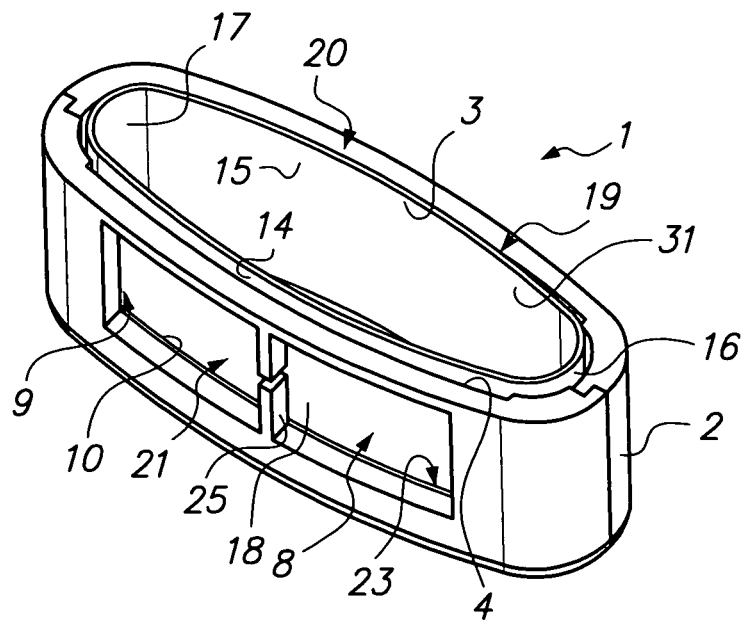
FIGS. 2A and 2B are perspective views of the uni-directional valve in the two different states of use without a cover.
Figure 2B:
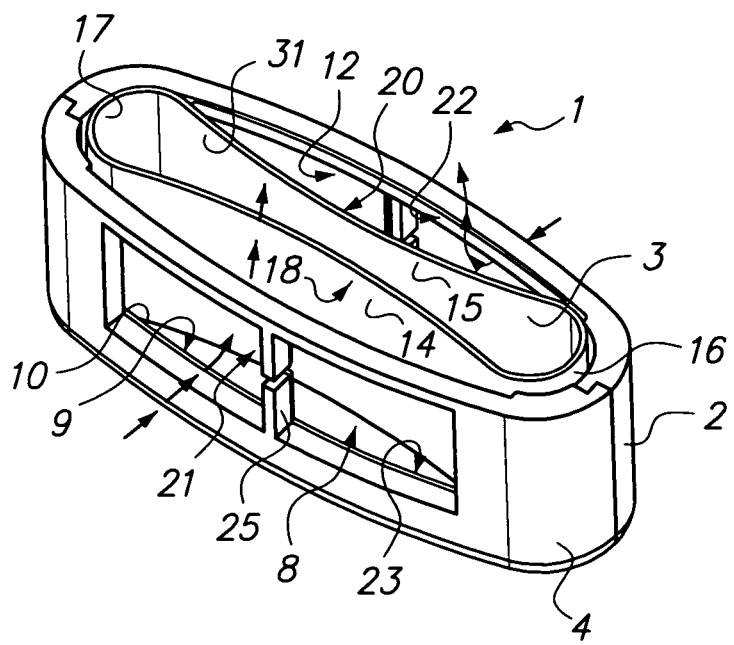

FIGS. 2A and 2B illustrate the uni-directional valve 1 without the cover 7 in perspective views. From these views it can be taken best that the cross-section of the valve element 3 corresponds substantially to the cross-section of the pot-like receptacle 4, into which the valve element 3 is inserted. The valve element 3 is held biased, e.g. with a pretension in the housing 2 in order to close the air passages 8 and 11 safely in a sealing manner. For the biased arrangement the valve element 3 comprises on its lateral surface a support portion 20 formed by the further sealing portion 19 and a further support portion 21 formed by the sealing portion 18. The support portion 20 and the further support portion 21 are accordingly located on opposite sides of the cylindrical shaped valve element 3, just like the sealing portion 18 and the further sealing portion 19. Furthermore, the housing 2 comprises a support section 22 interacting with the support portion 20 and a further support section 23 interacting with the further support portion 21. The support section 22 and the further support section 23 are arranged on opposite sides of the housing 2 or the pot-like receptacle 4. The support section 22 is formed by the further sealing section 12, while the further support section 23 is formed by the sealing section 9. The sealing ridges 10 and 13 both form a support element of the respective support section. The valve element abuts against the respective sealing ridge 10 or 13 with its lateral surface in its biased state.

The bias or pretension of the valve element 3 is caused by the distance between the support section 22 and the sealing section 9 being smaller than the distance between the support portion 20 and the sealing portion 18 in the unbiased state of the valve element 3.

Figure 3A:
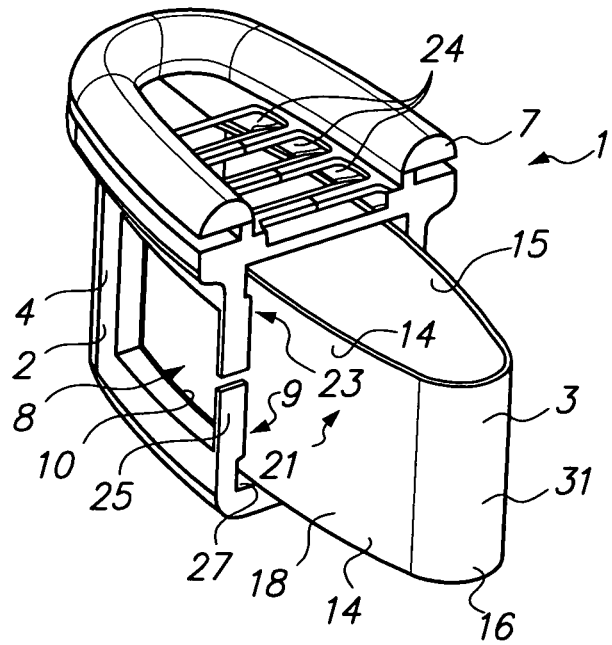
FIGS. 3A and 3B are sectional views of the uni-directional valve in the two different states of use.
Figure 3B:
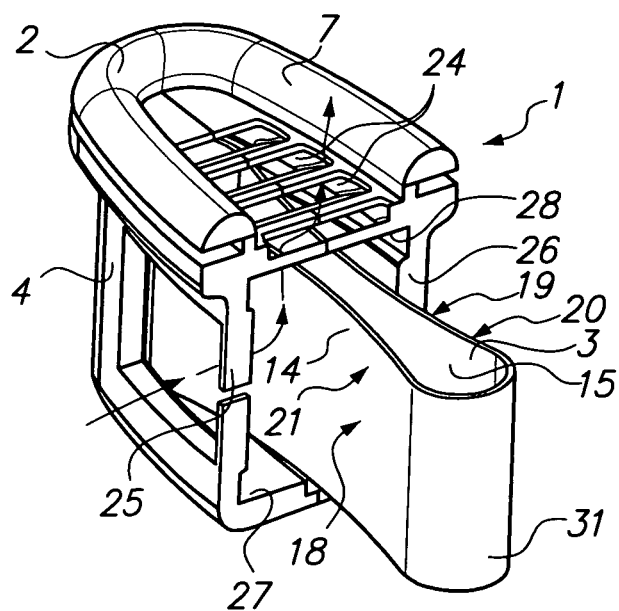

FIGS. 3A and 3B illustrate the uni-directional valve 1 in a part sectional view with only the housing 2 being shown sectional. Due to the shape of the valve element 3 the sealing portion 18 is pushed against the sealing section 9 of the housing 2 and the sealing portion 19 is pushed against the sealing section 12 of the housing 2 by the inherent elasticity of the valve element 3. The distance between the sealing section 9 and the sealing section 12 or the supporting section 22 and the further supporting section 23, the wall thickness of the tubular shaped valve element 3 and the material of the valve element 3 are chosen such that when a the valve element 3 is impinged by a sufficient air pressure coming from the air passage 8 or the further air passage 11, the sealing portion 18 and the further sealing portion 19 are moved from their sealing positions inwards, thereby opening the air passage 8 or the further air passage 11, respectively, where after an air stream can flow through the opened air passages 8, 11 as indicated by exemplary arrows in the Figures. FIGS. 1A. 2A and 3A show the uni-directional valve in the closed state, while FIGS. 1B, 2B and 3B illustrate the uni-directional valve 1 in a state where the valve element 3 is impinged at least by the sufficient air pressure to move the sealing portions 18 and 19 as described above for opening the air passages 8 and/or 11, respectively.

Figure 1B:
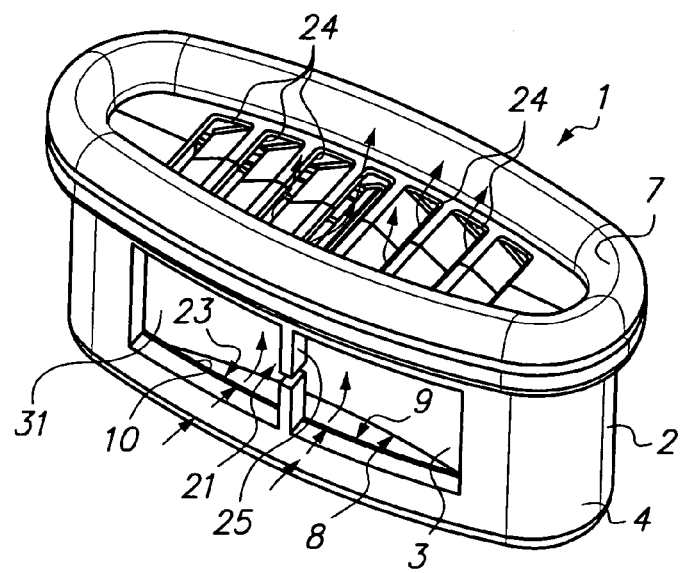

As shown in FIGS. 1A and 1B, the cover 7 of the receptacle forms multiple openings 24 through which air passing through the respective air passage 8, 11 can escape.

According to the present embodiment the support section 22 and the further support section 23 both comprise a support structure 25, 26, respectively. The support structures 25 and 26 are formed by two bars that extend across the air passages 8 and t l, respectively. The support structures 25 and 26 ensure that the valve element 3 stays inside of the housing 2 in any situation and that a sufficient pretension is guaranteed for closing the air passages 8, 11 in the neutral state. Of course it is possible to provide the support structures 25 and 26 with more bars than illustrated. The support structures 25 and 26 preferably form support element of the respective support section of the housing.

As illustrated in FIG. 4, the bottom 5 and the cover 7 each comprise an axial recess 27, 28 in the area of the sealing portions 18 and 19 of the valve element 3. This leaves the shorter sides 17 and 16 in direct contact with the bottom 5 and/or the cover 7, while the sealing portions 18 and 19 can swing freely without friction. This reduces the necessary air pressure for moving the sealing portions into their opened position and increases the comfort of wearing a ventilation device with that uni-directional valve 1.

For a fast and cost-effective manufacturing of the uni-directional valve 1 the housing 2 is preferably formed in several parts. In one embodiment the receptacle 4 can be one part, while the cover 7 forms a second part. According to the illustrated embodiment in FIGS. 1 to 4 the housing 2 of the uni-directional valve 1 is divided along the longer axis of the oval receptacle 4. In this way, the valve element 3 can be laid into one half of the receptacle 4 before the other half of the receptacle 4 is pushed onto the first half. The housing is designed as two halves that can be joined in a plane extending along the longer axis of the oval contour. In this case the cover is also divided in two parts whereas each part is designed in one piece with one half of the receptacle, respectively.

Figure 5:
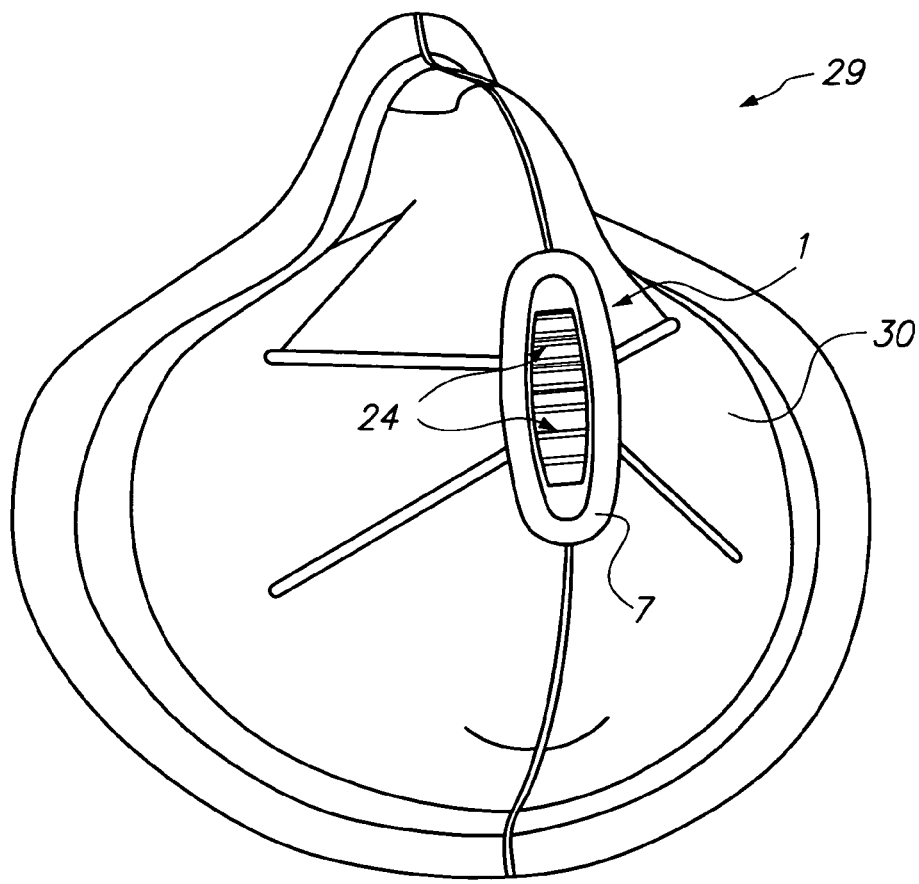
FIG. 5 is a perspective view of a filtering face mask comprising the uni-directional valve and FIGS. 6A and 6B are sectional views of the filtering face mask in the two different states of use of the unidirectional valve.
Figures 6A, 6B:
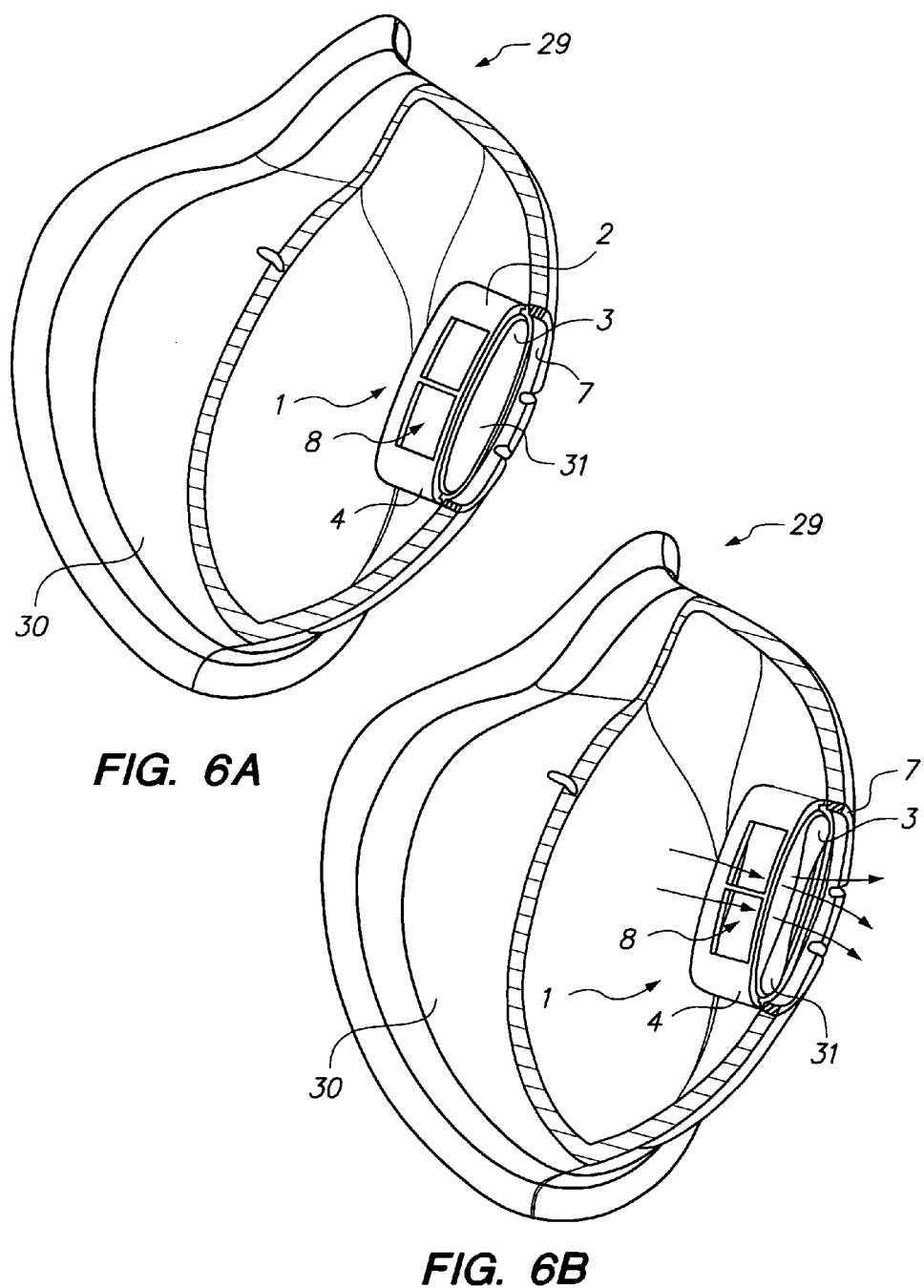

FIG. 5 illustrates a filtering face mask 29 that comprises a mask body 30 that is adapted to fit over nose and mouth of a person. Attached to the mask body 30 is the uni-directional valve 1 as exhalation valve in a penetrating manner such that the cover 7 with the openings 24 is essentially located on the side of the mask body 30 facing away from the person, while the receptacle 4 is located on the inside of the mask body 30 or in other words on the side facing the person wearing the mask, as shown in FIGS. 6A and 6B. The uni-directional valve 1 is preferably held on the mask body 30 in a form- or force-fitting manner or by material engagement. According to a preferred embodiment the uni-directional valve 1 is attached to the mask body 30 by being pressed into a respective opening of the mask body 30 preferably held in a form- and force-fitting manner. The opening of the mask body 30 is preferably smaller than the outer contour of the uni-directional valve 1 such that the uni-directional valve 1 is friction-locked in the opening of the mask body 30. It is also possible to clamp parts of the mask body 30 between parts of the uni-directional valve 1 for a safe and hermetically sealed attachment. Additionally, the uni-directional valve is preferably attached to the mask body 30 by using an adhesive component between the unidirectional valve 1 and the mask body 30. According to an alternative embodiment the uni-directional valve 1 can be attached to the mask body 30 by a welding technique, in particular by ultrasonic welding.

FIGS. 6A and 6B illustrate the filtering face mask 29 in the closed state FIG. 6A and in the open state FIG. 6B. The unidirectional valve 1 is preferably arranged directly over the mouth of the wearer of the filtering face mask 29. Due to the low pressure necessary for moving the sealing portions 18 and 19 into their opening position and since the uni-directional valve 1 offers two moveable sealing portions, only a very low pressure is necessary for opening the uni-directional valve 1 during exhalation.

Therefore, the filtering face mask 29 offers to the user a high comfort and the safety that no contaminants will pass through the air passage from the outside of the filtering face mask 29. The biased arrangement of the valve element 3 ensures that the air passages 8 and 11 are closed immediately after the user is finished exhaling.

We claim:

1. Uni-directional exhalation valve for an exhalation air path of a filtering face mask, comprising a flexible valve element, which is held biased in a housing of the unidirectional valve to close at least one air passage located in a sealing section of the housing with a sealing portion in a sealing manner and to at least partially open the air passage if the valve element is impinged by a sufficient air pressure against the bias, wherein the valve element is designed as a tubular cylinder and that the sealing portion is located on the lateral surface of the cylinder, whereby the sealing portion is located opposite to a support portion located on the lateral surface of the cylinder, the support portion interacting with a support section of the housing, and whereby for causing the bias the distance between the support section and the sealing section of the housing is smaller than the distance between the support portion and the sealing portion in the unbiased state of the valve element, and further wherein at least one opening through which air passing through the air passage can escape is formed in the housing at least essentially perpendicular to the air passage, and further wherein the cross-section of the cylinder is oval, whereby the sealing portion and the support portion are formed by the longer sides of the oval cross-section, respectively, and further wherein the housing comprises a pot-like receptacle with a cylindrical cross-section in which the valve element is coaxially held, the cylindrical cross-section substantially corresponding to the cross-section of the valve element.

2. A valve according to claim 1, wherein the cross-section of the cylinder is initially ring-shaped before being located in the housing.

3. A valve according to claim 1, wherein the opposite shorter sides of the oval cylinder are arranged spaced apart to the housing.

4. A valve according to claim 1, wherein the housing comprises a further sealing section with a further air passage formed in the support section of the housing and that the sealing section with the air passage forms a further support section of the housing.

5. A valve according to claim 4, wherein the sealing portion of the valve element forms a further support portion interacting with the further support section of the housing and that the support portion of the valve element forms a further sealing portion interacting with the further sealing section of the housing.

6. A valve according to claim 5, wherein the support section and/or the further support section comprise a support structure extending at least partially across the respective air passage.

7. A valve according to claim 1, wherein the housing comprises a cover arranged on the receptacle.

8. A valve according to claim 7, wherein the cover or a bottom of the receptacle form one or more of the openings through which air passing through the air passage or a further air passage can escape.

9. A valve according to claim 7, wherein a bottom and/or the cover of the receptacle comprise a recess which is located in an area of the sealing portion, of the valve element.

* * * * *